United States Patent [19]

Melnick

[11] Patent Number: 4,787,852
[45] Date of Patent: Nov. 29, 1988

[54] MULTICOLOR INTERACTIVE NOTEPAD

[76] Inventor: David W. Melnick, 358 Westgate Dr., Edison, N.J. 08820

[21] Appl. No.: 42,123

[22] Filed: Apr. 24, 1987

[51] Int. Cl.⁴ .......................... G09B 3/00; B41M 5/12
[52] U.S. Cl. .................................. 434/328; 427/145; 428/29
[58] Field of Search ................. 434/84, 328; 427/145, 427/150; 428/29, 199; 106/21

[56] References Cited

U.S. PATENT DOCUMENTS

| | | | |
|---|---|---|---|
| 1,866,545 | 7/1932 | Cohen | 434/328 |
| 1,884,197 | 10/1932 | Paterson et al. | 434/328 |
| 2,857,698 | 10/1958 | Arthur . | |
| 3,363,336 | 9/1968 | Skinner | 434/328 |
| 3,451,143 | 6/1969 | Thomas et al. | 434/328 |
| 3,454,344 | 7/1969 | Ryan et al. | 434/328 |
| 3,516,177 | 6/1970 | Skinner | 434/328 |
| 3,617,325 | 11/1971 | Spokes | 434/328 |
| 3,632,364 | 1/1972 | Thomas et al. | 427/145 |
| 3,677,786 | 7/1972 | Hollmann et al. | 427/145 |
| 3,823,022 | 7/1974 | Thomas | 427/145 |
| 3,979,550 | 9/1976 | Panken | 434/328 |
| 4,139,965 | 2/1979 | Curry | 434/328 |
| 4,198,445 | 4/1980 | Sokol | 434/328 |
| 4,631,203 | 12/1987 | Schaefer . | |

FOREIGN PATENT DOCUMENTS

68519A/82 6/1984 Italy .

Primary Examiner—Richard J. Apley
Assistant Examiner—J. Welsh
Attorney, Agent, or Firm—Sperry, Zoda & Kane

[57] ABSTRACT

A kit for producng symbols of unpredictable colors on paper including a plurality of individual sheets of paper each having a coating therein containing a reactant composition. A writing instrument is included in the kit to be usable with the various paper substrates supplied therein for writing thereon in various colors depending upon which reactant is contained within the coating of a particular piece of paper. The different paper substrates each will include a reactant chosen from one of several reactants used in the kit. Each of these individual reactants when contacted by the writing instrument will react with an agent in the fluid of the writing instrument to display a coloration on the paper substrate which is different from the reacted coloration resulting from usage with a different reactant. Each paper substrate has a base coloration which is in no way indicative of the particular reactant contained in the coating thereon. Thus prior to use, a user will not know what color the writing will become on different pieces of paper substrate.

1 Claim, 1 Drawing Sheet

MULTICOLOR INTERACTIVE NOTEPAD

BACKGROUND OF THE INVENTION

1. Field of the Invention

The present invention deals with the field of devices usable for conveniently providing notepads or desk memos in standard office or home applications. Conventional paper is bound together in standard pad form and is usable with any different type of pen or writing implement, however, under the present invention a particular writing implement is usable with a particular binding of paper substrates to provide an alternate result of different ink coloration in an unpredictable manner.

2. Background of the Invention

Examples of interactive writing implement and substrate kits utilizing coatings on the paper substrate are shown such as in U.S. Pat. No. 1,866,545 issued July 12, 1932 to J. G. Cohen for a Game Device; U.S. Pat. No. 1,884,197 issued Oct. 25, 1932 to H. J. Peterson et al for a Self Instructor and Tester, U.S. Pat. No. 2,857,698 issued Oct. 28, 1958 to W. H. Arthur for a Water Color Picture; U.S. Pat. No. 3,363,336 issued Jan. 16, 1968 to B. F. Skinner for Method and Devices for Teaching Writing Skills; U.S. Pat. No. 3,451,143 issued June 24, 1969 to R. E. Thomas et al on Spirit Duplication with Visible and Concealed Images; U.S. Pat. No. 3,454,344 issued July 8, 1969 to J. W. Ryan et al on Games Deploying pH-Sensitive Media; U.S. Pat. No. 3,516,177 issued June 23, 1970 to B. F. Skinner on a Teaching Device with Invisible Answer Indicator; U.S. Pat. No. 3,617,325 issued Nov. 2, 1971 to R. E. Spokes et al on Writing; U.S. Pat. No. 3,632,364 issued Jan. 4, 1972 to R. E. Thomas et al on Printed Sheets Containing Concealed Images and Method & Materials for Preparation and Visual Development of Same; U.S. Pat. No. 3,677,786 issued July 18, 1972 to W. G. Hollmann et al for a Line Drawing and Marking System; U.S. Pat. No. 3,823,022 issued July 9, 1974 to R. E. Thomas for a Method For Making Copy Sheets with a Concealed Image and Visual Development of Same; U.S. Pat. No. 3,979,550 issued Sept. 7, 1976 to I. Pankin on Pre-Printed Latent Image Spirit Duplicating Masters; U.S. Pat. No. 4,051,283 issued Sept. 27, 1977 to R. E. Thomas et al on Printed Sheets Containing Concealed Images and Method and Materials for Preparation and Visual Development of Same; U.S. Pat. No. 4,172,605 issued Oct. 30, 1979 to B. J. Welsch et al on a Chemically Reactive Recording Medium; U.S. Pat. No. 4,188,431 issued Feb. 12, 1980 to P. E. Sokol et al on Latent Image Printing and Development and U.S. Pat. No. 4,322,466 issued Mar. 30, 1982 to R. P. J. Tomlinson on Sheet Printed with Invisible Inks.

SUMMARY OF THE INVENTION

The present invention provides a kit for producing symbols of unpredictable colors on paper which includes a plurality of individual sheets or paper substrates each having a coating on one or both sides. The coating includes in the composition thereof a reactant. The kit further includes a writing instrument which contains a fluid therein which is preferably clear and colorless. This fluid will contain an agent which is responsive upon contact with one of the reactants in the paper substrate to display a coloration. Each of the coating means will include one of a plurality of reactants, each of which will be interactive with respect to the reactant in the fluid of the writing instrument to display a different coloration on the paper when the writing instrument is used thereon.

A binding means will be included for securing a plurality of the paper substrates with respect to one another in a standard notepad form. The coloration layer can be included on both sides or completely surrounding the individual sheets of paper. Preferably the agent within the writing instrument will be an oxidizing agent adapted to interact with the coating of the paper substrate to provide the reacted coloration upon writing thereon.

Each paper substrate will also include a base coloration thereof which can be independent of the coating thereon containing the reactant. That is, upon viewing of a particular paper substrate the user will not know what final coloration will result from interacting between the reactant of the coating on the paper substrate and the oxidizing agent in the writing instrument. This will provide a surprise writing color each time a new paper substrate is utilized which is a distinct novelty of the present invention.

It is an object of the present invention to provide a kit for producing symbols of unpredictable colors on paper wherein a plurality of individual paper substrates are bound together each including a coating means thereon having a different reactant.

It is an object of the present invention to provide a kit for producing symbols of unpredictable colors on paper wherein the color of writing on each individual paper substrate is unknown to the user prior to the initiation of writing with the writing instrument of the kit.

It is an object of the present invention to provide a kit for producing symbols of unpredictable colors on paper wherein many different varieties of coloration are made possible with one given writing instrument dependent upon which reactant is located within the coating means of a particular piece of paper.

It is an object of the present invention to provide a kit for producing symbols of unpredictable colors on paper wherein each paper substrate includes a base coloration upon initial review and a reactant coloration responsive to chemical interacting with the oxidizing agent of the pen of the kit.

It is an object of the present invention to provide a kit for producing symbols of unpredictable colors on paper wherein a novel memo pad or desk pad is made readily available.

It is an object of the present invention to provide a kit for producing symbols of unpredictable colors on paper wherein costs are minimized.

It is an object of the present invention to provide a kit for producing symbols of unpredictable colors on paper wherein maintenance fees are greatly minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
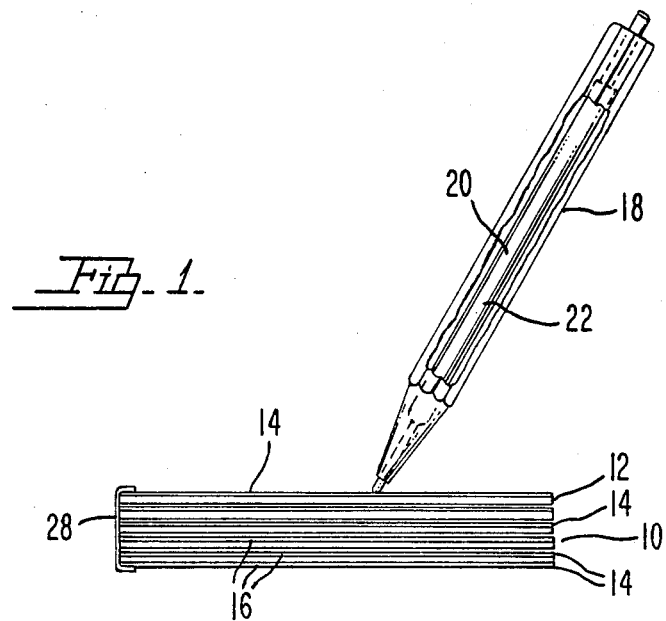
FIG. 1 is an illustration of an embodiment of the kit for producing symbols of unpredictable colors on paper showing the writing instrument in abutment with respect to the coating means on the upper surface of a paper substrate.
Figure 2:
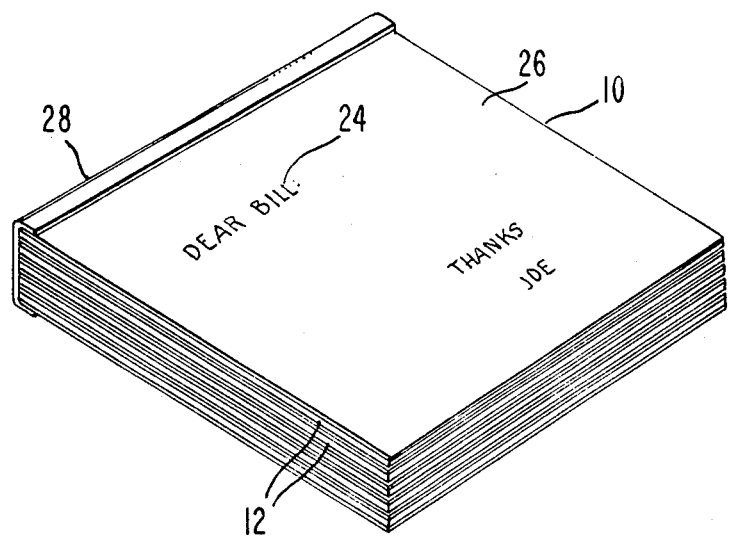
FIG. 2 is an illustration of a plurality of individual paper substrates secured with respect to one another by a binding means.

A kit is disclosed for producing symbols of unpredictable colors on paper which may include a plurality of paper substrates 12 capable of being bound with respect to one another by a binding means 28 into the format of a notepad 10. Each paper substrate will include on at least one side thereof a coating means 14 which includes a reactant means 16 therein. Coating means 14 located only on one side of the paper substrate 12, will be on the upper side as bound in the notepad 10 by a binding means 28.

The kit further includes a writing instrument 18 which may be a pen or marking pen which is adapted to contain therein a fluid 20 preferably carrying an oxidizing or other chemically reactive agent 22 therein.

The fluid 20 within writing instrument 18 is responsive to chemically react with the reactant means 16 in the coating means 14 of paper substrate 12 to cause a reacted coloration 24 to appear on paper substrate 12. This reacted coloration will be dependent upon which of the many available reactant means 16 the individual paper substrate 12 is coated with.

Furthermore each paper substrate 12 will include a base coloration 26 thereon which is the basic color of the paper substrate 12 when initially viewed. The user will not know what the reacted coloration 24 will be with a specific paper substrate 12 since the reactant means 16 in the coating 14 is unknown prior to writing therein with the instrument 18. Therefore you may have a situation where the base coloration 26 may be red and the chemical interaction between the oxidizing agent 22 and the reactant means 16 in the coating 14 will result in white as the reacted coloration 24. In that situation when the user initiates writing on the notepad 10 with writing instrument 18, this will result in white writing on a red background.

Since there is no relationship between the base coloration 26 and the particular chosen reactant means 16 in the coating means 14 on a given paper substrate 12, there will be no way to predict by the user what the reacted coloration 24 will be on a given paper substrate 12. This surprise aspect of the present concept is particularly novel and marketable.

A particularly important aspect of the present invention is the fact that this is a clean system. That is, there can be no spilling, dripping or unwanted marking as is common with normal pens and marking pens. In view of the fact that the actual liquid in the marking instrument itself is a clear liquid, there can be no such stray marks except those specifically desired as made directly on interacting paper or substrate.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A kit for producing symbols of unpredictable color on paper comprising:
   (a) a plurality of paper substrates each having a coating means on both sides thereof, each of said coating means including one of a plurality of different reactant means, said paper substrates each displaying one of a plurality of different base colors;
   (b) a binding means for securing together a plurality of said paper substrates with respect to one another; and
   (c) a marking pen means containing a clear colorless fluid therein including an oxidizing agent therein being reactable with respect to each different one of said reactant means of said coating means from displaying an associated different opaque coloration after interaction therewith.

* * * * *

UNITED STATES PATENT AND TRADEMARK OFFICE
CERTIFICATE OF CORRECTION

PATENT NO. : 4,787,852

DATED : November 29, 1988

INVENTOR(S) : David W. Melnick

It is certified that error appears in the above-identified patent and that said Letters Patent is hereby corrected as shown below:

Column 4, line 39, change "from" to -- for --.

Signed and Sealed this

Twenty-fifth Day of July, 1989

Attest:

DONALD J. QUIGG

Attesting Officer

Commissioner of Patents and Trademarks